(12) United States Patent
Kawase (10) Patent No.: US 8,538,709 B2
(45) Date of Patent: Sep. 17, 2013

(54) BATTERY LEARNING SYSTEM

(75) Inventor: Ayako Kawase, Gamou-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 662 days.

(21) Appl. No.: 12/747,748

(22) PCT Filed: Nov. 20, 2008

(86) PCT No.: PCT/JP2008/071083
§ 371 (c)(1),
(2), (4) Date: Jun. 11, 2010

(87) PCT Pub. No.: WO2009/078243
PCT Pub. Date: Jun. 25, 2009

(65) Prior Publication Data
US 2010/0287126 A1 Nov. 11, 2010

(30) Foreign Application Priority Data

Dec. 14, 2007 (JP) .................... 2007-323055

(51) Int. Cl.
*G01R 27/08* (2006.01)
*H01M 8/04* (2006.01)
*G05B 99/00* (2006.01)
*G06F 11/30* (2006.01)
*G06F 19/00* (2011.01)
*G06F 17/40* (2006.01)

(52) U.S. Cl.
USPC ... 702/63; 318/490; 340/636.11; 340/636.12; 340/636.13; 340/636.15; 340/636.19; 340/648; 700/14; 700/306; 702/107; 702/182; 702/187; 702/189; 708/200

(58) Field of Classification Search
USPC ......... 73/1.01, 432.1, 865.8, 865.9; 318/490; 324/72, 76.11, 425, 426, 430; 340/500, 540, 340/635, 636.1, 636.11, 636.12, 636.15, 340/636.19, 648, 679; 700/1, 9, 11, 12, 14, 700/90, 306; 702/1, 57, 60, 63, 64, 65, 85, 702/107, 127, 182, 187, 189; 706/12; 708/100, 708/105, 200
IPC .......... G01D 21/00; G01R 27/00, 27/02, 27/08, G01R 31/00, 31/36, 31/3606, 31/3624; G05B 99/00; G06F 11/00, 11/30, 11/32, 17/00, G06F 17/40, 19/00; H01M 8/00, 8/04, 8/04298, H01M 8/04313, 8/04537, 8/04544, 8/04552, H01M 8/04559, 8/04567, 8/04574, 8/04582, H01M 8/04589, 8/04597, 8/04634, 8/04641, H01M 8/04649, 8/04659
See application file for complete search history.

(56) References Cited

U.S. PATENT DOCUMENTS 3,522,481 A * 8/1970 Brant .............................. 361/92
4,025,916 A * 5/1977 Arnold et al. ............. 340/636.16
6,167,309 A * 12/2000 Lyden ............................ 607/29

(Continued)

FOREIGN PATENT DOCUMENTS

JP 08-138710 A 5/1996
JP 10-083824 A 3/1998

(Continued)

*Primary Examiner* — Edward Cosimano
(74) *Attorney, Agent, or Firm* — Kenyon & Kenyon LLP (57) ABSTRACT

A fuel battery system is comprised of a power source circuit, a rotating electrical machine that is a load, a memory device and a control unit. Here, a battery learning system corresponds to an arrangement including a fuel battery that is a structural component of the power source circuit, a high frequency signal source, an electric current detection means, a voltage detection means, the memory device and a battery learning part that is a structural element of the control unit. An impedance value can be obtained from alternating current components of respective detecting values of the electric current detection means and the voltage detection means. The battery learning unit has an I-V characteristic curve learning module that learns an I-V characteristic curve and a learning prohibition judgment module that judges whether or not an acquiring interval of the impedance value is over a predetermined threshold interval set in advance, and prohibits learning if the former is over the latter.

4 Claims, 3 Drawing Sheets

(56) References Cited

U.S. PATENT DOCUMENTS

| | | | |
|---|---|---|---|
| 7,202,632 B2 * | 4/2007 | Namba | 320/132 |
| 2006/0176022 A1 * | 8/2006 | Namba | 320/130 |

FOREIGN PATENT DOCUMENTS

| | | | |
|---|---|---|---|
| JP | 2003-014796 A | 1/2003 | |
| JP | 2006-220629 A | 8/2006 | |
| JP | 2007-018741 A | 1/2007 | |
| JP | 2007-048628 A | 2/2007 | |
| JP | 2007-207442 A | 8/2007 | |
| JP | 2007-250365 A | 9/2007 | |
| JP | 2008-098134 A | 4/2008 | |
| JP | 2008-235027 A | 10/2008 | |
| JP | 2008-300177 A | 12/2008 | |

* cited by examiner

BATTERY LEARNING SYSTEM

This is a 371 national phase application of PCT/JP2008/071083 filed 20 Nov. 2008, claiming priority to Japanese Patent Application No. JP 2007-323055 filed 14 Dec. 2007, the contents of which are incorporated herein by reference.

TECHNICAL FIELD

The present invention relates to a battery learning system, and in particular, relates to a battery learning system for learning an actually measured characteristic value to thereby sequentially update an output characteristic of a battery which operates through an electrochemical reaction.

BACKGROUND ART

For example, in order to determine an operating point used for controlling the fuel battery, a current-voltage characteristic or a current-power characteristic is used as an output characteristic of a fuel battery. The former is a so-called I-V characteristic while the latter is a so-called I-P characteristic. The output characteristic of the fuel battery, which can vary depending on working conditions of the fuel battery, is updated while performing a learning process through actual measurement from moment to moment.

For example, Patent Publication 1 describes a learning process performed on an I-V characteristic used in power source control processing of a fuel battery to compensate for the I-V characteristic in accordance with an operating state of the fuel battery. In this publication, it is determined whether or not a fuel battery system is in steady operation. Then, because an update of the I-V characteristic is regarded as being not applicable while the fuel battery system is not in the steady operation, the power source control processing is performed based on a presently stored I-V characteristic. On the other hand, when the fuel battery system is determined to be in the steady operation, the process is advanced to processing for updating the I-V characteristic. The publication further discloses that, in the processing for updating the I-V characteristic, it is determined whether or not a current value output from the fuel battery at the present time matches a value defined for each predetermined step set in advance. When matching is not determined, the power source control processing is performed based on the presently stored I-V characteristic, and when the matching is determined, the I-V characteristic is updated on the basis of an actual voltage value from a voltage sensor.

In addition, it is also described as a second embodiment that means for calculating an alternating current impedance of the fuel battery is provided, to obtain a theoretical I-V characteristic in which a voltage drop due to an internal resistance corresponding to the alternating current impedance is eliminated. Also for the theoretical I-V characteristic, it is described that an update of the theoretical I-V characteristic is performed during the steady operation when the current value matches the value defined for each predetermined step.

Patent Document 1: JP 2007-48628 A1

DISCLOSURE OF THE INVENTION

Problems to be Solved by the Invention

According to Patent Document 1, it is possible to learn an I-V characteristic curve which is an output characteristic curve using, as characteristic values, the electric current value and the voltage value output at the present time from the fuel battery, and it is also possible to learn the theoretical I-V characteristic using impedance measurement.

However, although measurement of an actual electric current value and an actual voltage value is possible, a true value is not always obtained for the impedance value. More specifically, the impedance value, which is calculated based on a electric current value and a voltage value, does not necessarily represent a true impedance depending on the electric current value or the voltage value. For example, there may be a case where the impedance becomes apparent infinity and differs from an actual impedance value when an electric current value is zero.

When the output characteristic value is updated, in spite of the fact that the actual impedance is not obtained, using the theoretical I-V characteristic curve determined based on the apparent impedance value, an improper update is performed, which leads to decrease in accuracy of the output characteristic curve.

The present invention is directed to provide a battery learning system capable of obtaining a more accurate output characteristic curve.

Means for Solving the Problems

In a battery learning system according to the present invention, an output value at a predetermined characteristic step point set in advance is used as a characteristic value for an output characteristic of a battery that operates through an electrochemical reaction, the output characteristic is plotted as an output characteristic curve by connecting each discrete characteristic value, and the characteristic value obtained by actual measurement is learned to update the output characteristic curve. The battery learning system comprises acquisition means that acquires an actual characteristic value of the battery, impedance value acquisition means that acquires an impedance value of the battery, storage means that stores the output characteristic curve of the battery, and update means that updates the stored output characteristic curve based on the acquired actual characteristic value under a specific condition defined in advance. Further, the update means comprises judgment means that judges whether or not an acquiring interval between acquisitions of the impedance value performed by the impedance acquisition means exceeds a predetermined threshold interval set in advance, and prohibition means that prohibits the output characteristic curve from being updated when the acquiring interval is judged to exceed the threshold interval by the judgment means.

Further, in the battery learning system according to the present invention, it is preferable that the output characteristic of the battery is a current-voltage characteristic of the battery, while the output characteristic curve is an I-V characteristic curve. It is also preferable that calculation means is provided to calculate an activation overvoltage which is a voltage value determined eliminating a voltage drop due to an internal resistance of the battery from the actual voltage value that is determined based on the impedance value of the battery. Preferably, the storage means stores an actual I-V characteristic curve relating, as actual output values of the battery, an actual electric current value to the actual voltage value, and a theoretical I-V characteristic curve relating the activation overvoltage to the actual electric current value of the battery. It is preferable that when the acquiring interval is judged to exceed the threshold interval by the judgment means, the prohibition means prohibits updating of the theoretical I-V characteristic curve and prohibits updating of the actual I-V characteristic curve learned on the basis of the theoretical I-V characteristic curve.

Further, in the battery learning system according to the present invention, it is also preferable that the impedance value acquisition means does not acquire the impedance when the actual electric current value of the battery is zero or when a varying amount per unit time of the actual electric current value exceeds a predetermined varying amount per unit time set in advance.

Still further, in the battery learning system according to the present invention, the battery is preferably a fuel battery.

Effect of the Invention

According to the above-described structure, the battery learning system acquires the actual characteristic value of the battery, and updates the stored output characteristic curve based on the acquired actual characteristic value under the specific condition defined in advance. Then, the battery learning system judges whether or not the acquiring interval of the impedance value of the battery exceeds the predetermined threshold interval set in advance, and prohibits the updating of the output characteristic curve when the acquiring interval is judged to exceed the threshold interval. When the true impedance value is unavailable, an update might be incorrectly performed by updating the output characteristic curve, such as the I-V characteristic curve, based on the apparent impedance value. According to the above-described structure, however, because the updating of the output characteristic curve is prohibited if the impedance value is not acquired for a certain period in time, the incorrect update can be prevented, to thereby obtain the output characteristic curve with higher accuracy.

Further, in the battery learning system, when the output characteristic of the battery is the current-voltage characteristic of the battery, a voltage value is calculated as the activation overvoltage determined by eliminating the voltage drop due to the internal resistance of the battery from the actual voltage value, which is determined based on the impedance value of the battery. Then, an electric current to activation overvoltage characteristic curve is defined as the theoretical I-V characteristic curve, and the updating of the theoretical I-V characteristic curve and the updating of the actual I-V characteristic curve learned on the basis of the theoretical I-V characteristic curve are prohibited when the acquiring interval of the impedance value of the battery exceeds the predetermined threshold value set in advance. As a result, when the impedance value is not acquired for the certain period in time, the updating of the theoretical I-V characteristic curve and the updating of the actual I-V characteristic curve learned on the basis of the theoretical I-V characteristic curve are prohibited, to thereby prevent the incorrect update. Thus, it becomes possible to acquire the output characteristic curve with higher accuracy.

In addition, because the battery is the fuel battery in the battery learning system, the output characteristic curve of the fuel battery can be further improved in terms of accuracy.

LISTING OF REFERENCE NUMBERS:

10 fuel battery system,
11 power source circuit,
12 electrical power storage device,
14, 18 smoothing capacitor,
16 voltage converter,
20 inverter,
22 rotating electrical machine,
30 fuel battery,
32 high frequency signal source,
34 electric current detection means,
36 voltage detection means,
38 memory device,
39 output characteristic curve file,
40 control unit,
42 battery learning unit,
44 I-V characteristic curve learning module,
46 learning prohibition judgment module,
48 power supply drive controlling module,
60 characteristic step point,
62 characteristic value,
64 characteristic curve, and
66, 67 I-V characteristic curve.

BEST MODE FOR CARRYING OUT THE INVENTION

Hereinafter, a preferred embodiment of the present invention will be described in detail with reference to the drawings. Although a fuel battery will be explained as a battery whose output characteristic curve is learned in the description below, batteries other than the fuel battery may be used as long as the batteries are able to operate through an electrochemical reaction. For example, a secondary battery, such as a lithium ion secondary battery, a nickel hydrogen secondary battery, a lead storage battery, an alkaline battery, or a manganese battery, may be utilized.

Further, although a fuel battery system, equipped with a battery learning system, which performs drive controlling of a power source including a fuel battery based on an output characteristic curve of the fuel battery acquired through learning performed by the battery learning system will be described below, the battery learning system may be configured as an individual structure separated from the drive controlling of the fuel battery. In this case, the battery learning system may be composed of the fuel battery and a computer that performs a learning process, and results of the learning process may be transmitted to a fuel battery drive controller separately through data transfer or other ways.

Still further, although a configuration including a high-voltage electrical power storage device, the fuel battery, a voltage convertor, and an inverter of high-voltage operation will be described as a power source circuit below, the power source circuit may include components other than those listed above. For example, a system main relay, a low-voltage battery, a DC/DC convertor of low-voltage operation, and the like may be contained. Although the inverter using a rotating electrical machine, which is a motor/generator (M/G), as a load will be described, another inverter that uses an auxiliary machine for the fuel battery as the load may of course be provided.

Figure 1:
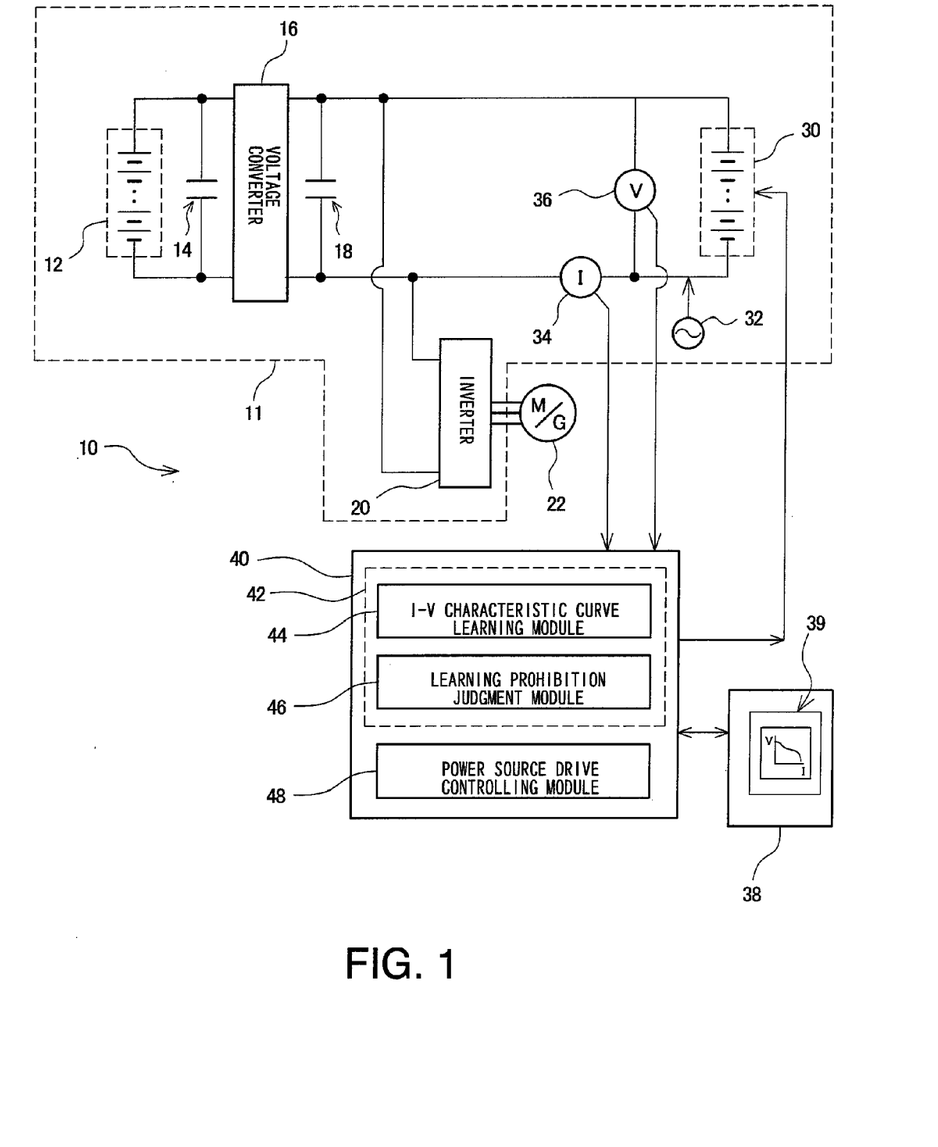
FIG. 1 is a diagram showing a configuration of a fuel battery system equipped with a battery learning system according to an embodiment of the present invention.

FIG. 1 is a diagram showing a configuration of a fuel battery system 10 equipped with a battery learning system. The fuel battery system 10 is configured to include a power source circuit 11, a rotating electrical machine 22 acting as the load, a memory device 38, and a control unit 40. Here, the battery learning system corresponds to a portion including a fuel battery 30, a high frequency signal source 32, an electric current detection means 34, and a voltage detection means 36 which are components of the power source circuit 11, and a battery learning part 42 which is a component of the control unit 40 and the memory device 38.

The power source circuit 11 is configured to include an electrical power storage device 12, a smoothing capacitor 14 on a secondary battery side, a voltage convertor 16, a smoothing capacitor 18 on a fuel battery side, the fuel battery 30, and an inverter 20. Further, in the power source circuit 11, the high frequency signal source 32, the electric current detection means 34, and the voltage detection means 36 are disposed on the fuel battery 30 side.

The electrical power storage device 12, which is a high voltage secondary battery capable of charging and discharging, has a function of interchanging power via the voltage convertor 16 with the fuel battery 30 to meet a variation in load of the rotating electrical machine 22 and others. As the above-described electrical power storage device 12, for example, a lithium ion battery pack or a nickel-metal hydride battery pack having a terminal voltage of from approximately 200 V to approximately 300 V, a capacitor, or the like may be used. It should be noted that the battery learning system, which is applicable to the learning of the output characteristic curve of a battery that operates through a electrochemical reaction, may be applied to the lithium ion battery pack or the nickel hydrogen battery pack. Hereinafter, however, the battery learning system will be described as being applied only to the learning of the output characteristic curve of the fuel battery 30.

The voltage converter 16 is a circuit disposed between the electrical power storage device 12 and the fuel battery 30. For example, when the fuel battery 30 is deficient in electrical power, the electrical power is supplied from the electrical power storage device 12 via the voltage converter 16 to the load, while for charging the electrical power storage device 12 the electrical power is supplied from the fuel battery 30 via the voltage converter 16 to the electrical power storage device 12. As the voltage converter 16 of the above-described type, a bidirectional converter including a reactor may be used.

The smoothing capacitors are respectively disposed on both sides of the voltage converter 16. More specifically, the smoothing capacitor 14 for the secondary battery side is disposed between a positive electrode bus and a negative electrode bus for connecting the voltage converter 16 to the electrical power storage device 12, while the smoothing capacitor 18 for the fuel battery side is disposed between a positive electrode bus and a negative electrode bus for connecting the voltage converter 16 to the fuel battery 30.

The fuel battery 30 is a type of assembled battery constructed by combining a plurality of fuel battery cells to extract generated output of a high voltage from approximately 200 V to approximately 300 V, and is referred to as a fuel cell stack. Here, each of the fuel battery cells has a function of extracting necessary power through the electrochemical reaction produced via an electrolytic film, which is a proton exchange membrane, by supplying hydrogen as a fuel gas to an anode side while supplying air as an oxidation gas to a cathode side.

The inverter 20 is a circuit that has both a function of converting high voltage direct current power into three phase alternating current drive power under the control of the control unit 40 and supplying the power to the rotating electrical machine 22, and a function of converting, in reverse, the three phase alternating current power regenerated from the rotating electric machine 22 into charging power of a high voltage direct current. The above-described inverter 20 may be composed of a circuit including switching elements, a diodes, and others.

The electric current detection means 34, which has a function of detecting an output electric current value of the fuel battery 30, is inserted in series with the negative electrode bus of the fuel battery 30. The electric current detection means 34 may be disposed on the positive electrode bus of the fuel battery 30 depending on conditions. As the electric current detection means 34 of the above-described type, an appropriate ammeter may be used.

The voltage detection means 36, which has a function of detecting an output voltage value of the fuel battery 30, is inserted in parallel with the fuel battery 30 between the positive electrode bus and the negative electrode bus of the fuel battery 30. As the voltage detection means 36 of the above-described type, an appropriate voltmeter may be used.

The high frequency signal source 32 is designed to supply a high frequency signal to the negative electrode bus of the fuel battery 30 for measurement of an impedance of the fuel battery 30. The supplied high frequency signal is detected as an alternating current (AC) component and a direct current (DC) component separately by the electric current detection means 34 and the voltage detection means 36. A DC current value as the output electric current value of the fuel battery and a DC voltage value as the output voltage value of the fuel battery 30 are respectively obtained from the direct current (DC) component. On the other hand, the impedance of the fuel battery 30 can be calculated from the alternating current (AC) component by a well-known AC impedance method.

Accordingly, the high frequency signal source 32, the electric current detection means 34, and the voltage detection means 36 correspond to an impedance value acquisition means used for acquising the impedance value. Specifically, the alternating current (AC) component in a detection value of the electric current detection means 34 and the alternating current (AC) component in a detection value of the voltage detection means 36 are transmitted to the control unit 40 where the impedance value is calculated.

The rotating electrical machine 22 is a three phase synchronous rotating electrical machine, such as, for example, a motor generator to be mounted in a vehicle, that functions as a motor when power is supplied from a power source circuit side, and functions as a generator during braking. The rotating electrical machine 22 is described herein by way of illustration of the load to the power source circuit 11.

The memory device 38 has a function of storing a program or the like executed in the control unit 40, and particularly in this example, has a function of storing an output characteristic curve file 39 for the fuel battery 30. Now, an more detailed explanation for an output characteristic curve of the fuel battery 30 will be described with reference to FIGS. 2 to 4. Reference numerals shown in FIG. 1 are used in the description below.

The output characteristic curve of the fuel battery 30 is an characteristic curve obtained with respect to an output characteristic of the fuel battery 30 by using, as characteristic values, discrete output values at predetermined characteristic step points set in advance and connecting each of the discrete characteristic values.

Figure 2:
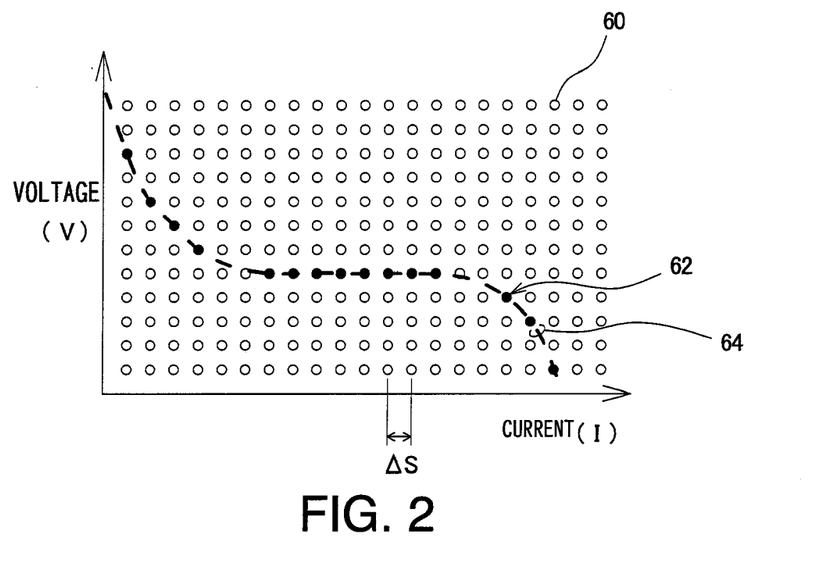
FIG. 2 is a diagram showing a shape of characteristic step points arranged in a grid pattern in which the output characteristic is defined as the current-voltage characteristic in the battery learning system according to the embodiment of the present invention.

FIG. 2 shows a shape of characteristic step points 60 arranged in a grid pattern on an I-V plane where the output characteristic is defined as current-voltage characteristics, and electric currents (I) are plotted along the horizontal axis while voltages (V) are plotted along the vertical axis. Although a fixed increment ΔS is shown in terms of the electric current (I) of the characteristic step points 60 in an example of FIG. 2, the increment ΔS does not necessarily have to be a fixed value. More specifically, the characteristic step points 60 may be arranged in any type of predetermined array where it is not necessary that the increment be the fixed value with respect to the electric current (I) and/or the voltage (V). Instead, the array may have a widely spaced form or a closely spaced form depending on measured areas.

Among the electric current values detected by the electric current detection means 34 and the voltage values detected by the voltage detection means 36 described in FIG. 1, only those corresponding to the characteristic step points 60 in FIG. 2 are acquired. The characteristic step points shown with black circles in FIG. 2 indicate measured characteristic values 62 of the fuel battery 30 obtained through actual measurement. Therefore, the characteristic values are expressed by a combination of (I=actual output electric current value, V=actual output voltage value). A curve shown by broken lines in FIG. 2, which is a characteristic curve 64 obtained by connecting the measured discrete characteristic values 62, represents the output characteristic curve of the fuel battery 30.

Figure 3:
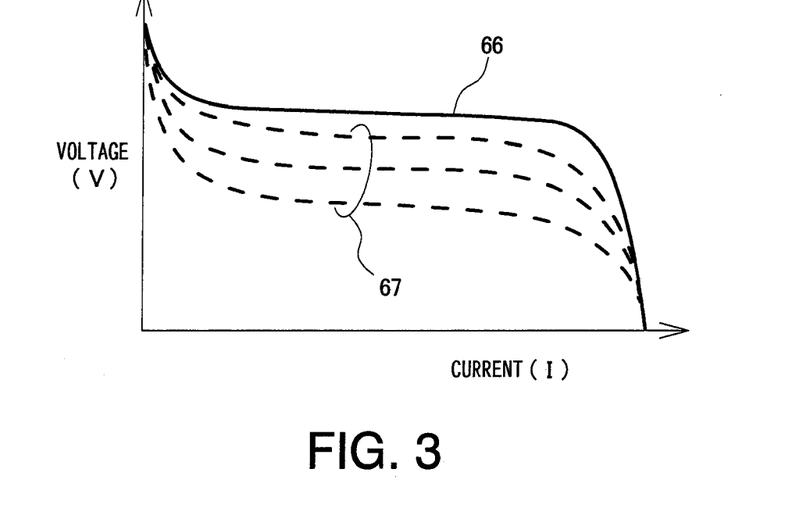
FIG. 3 is a schematic diagram showing current-voltage characteristic curves of a fuel battery in the battery learning system according to the embodiment of the present invention.

FIG. 3 is a schematic diagram showing the current-voltage characteristic curves employed as the output characteristic curves of the fuel battery 30. Hereinafter, the current-voltage characteristic curve and the current-voltage characteristic of the fuel battery 30 are referred to as an I-V characteristic curve and an I-V characteristic, respectively. Because the fuel battery 30 has an internal resistance, the I-V characteristic curves are affected by a voltage drop resulting from the internal resistance. Here, the magnitude of the internal resistance can be obtained by measuring an impedance and extracting a direct current (DC) component from the impedance.

In FIG. 3, a state in which the I-V characteristic curve is variated by the magnitude of the internal resistance of the fuel battery 30 is shown. With reference to the same electric current value, the voltage value increases as the internal resistance decreases. More specifically, an I-V characteristic curve 66 plotted taking the internal resistance as zero is the highest characteristic curve in terms of the voltage value, while I-V characteristic curves 67 plotted taking into account the presence of the internal resistance are lower characteristic curves in terms of the voltage value which is decreased as the internal resistance increases.

The I-V characteristic curve 66 plotted taking the internal resistance as zero is created using a voltage value determined by eliminating a voltage drop due to the internal resistance of the fuel battery 30 from the actual voltage value which is the output voltage value obtained by actual measurement of the fuel battery 30. A voltage value determined by eliminating the voltage drop due to the internal resistance from the actual voltage value is referred to as an activation overvoltage or a theoretical voltage. Accordingly, the I-V characteristic curve 66 is referred to as an electric current to activation overvoltage characteristic curve or a theoretical I-V characteristic curve.

On the other hand, the I-V characteristic curves 67 plotted using the actual electric current values measured by the electric current detection means 34 and the actual voltage values measured by the voltage detection means 36 are those representing actual measurement values without elimination of the voltage drop due to the internal resistance, the I-V characteristic curves 67 may be referred to as an actual I-V characteristic curve.

Because an effect of the internal resistance in the battery is eliminated, as described above, from an activation overvoltage characteristic of the battery, the activation overvoltage characteristic is relatively insusceptible to operating and other conditions of the battery. It is therefore preferable that, after learning the theoretical I-V characteristic curve based on the measured impedance values, the actual I-V characteristic curve, which has been already acquired, is learned on the basis of the learned theoretical I-V characteristic curve. In other words, it is preferable that after the theoretical I-V characteristic curve is updated based on the measured impedance values, the actual I-V characteristic curve is updated on the basis of the updated theoretical I-V characteristic curve.

Although the I-V characteristic curve has been explained as the output characteristic curve of the fuel battery in the above description, a current-power characteristic curve may be used as the output characteristic curve which can be applied to the controlling of power source drive in the fuel battery system 10. The current-power characteristic curve is referred to as an I-P characteristic curve. The I-P characteristic curve also includes, in addition to a theoretical I-P characteristic curve using a result obtained using the actual electric current values and the activation overvoltage, an actual I-P characteristic curve produced by obtaining an actual power value from a result obtained using the actual electric current values measured by the electric current detection means 34 and the actual voltage values measured by the voltage detection means 36.

Referring back to FIG. 1 again, a result of learning the above-described output characteristic curves and the like are stored as the output characteristic curve file 39 in the memory device 38.

The output characteristic curves are learned as described below. Hereinafter, a learning process for the I-V characteristic curve will be described. The learning process for the I-V characteristic curve includes an initial learning process of creating a first initial I-V characteristic curve and an ordinary learning process applied to a previously obtained I-V characteristic curve for updating the I-V characteristic curve based on the measured characteristic value.

The initial learning process is performed by connecting the characteristic values measured at each of the characteristic step points 60 described in FIG. 2. In other words, a curve obtained by connecting each of the characteristic step points corresponding to the measured characteristic values 62 is the first I-V characteristic curve in the initial learning process.

The ordinary learning process is performed on the I-V characteristic curve, which has been already acquired in the first learning process or others, in such a manner that the voltage value corresponding to the measured actual electric current value is exchanged from the existing voltage value which has been learned already to the measured actual voltage value.

Impedance measurement is performed both in the initial learning process and in the ordinary learning process. Therefore, the theoretical I-V characteristic curve and the actual I-V characteristic curve are respectively learned in the initial learning process based on the actual electric current value, the actual voltage value, and the impedance value obtained from the alternating current (AC) components of the actual electric current and voltage values. Then, the theoretical I-V characteristic curve having been acquired already is learned on the basis of subsequently measured actual electric current and voltage values and impedance values obtained from the alternating current (AC) components of the subsequently measured actual current and voltage values. In other words, the theoretical I-V characteristic curve is updated. Further, the actual I-V characteristic curve having been acquired already is learned on the basis of the actual electric current value and the actual voltage value. In other words, the actual I-V characteristic curve is updated.

It should be noted that because the impedance value is an alternating current (AC) component of the voltage value divided by an alternating current (AC) component of the electric current value in a modeled way, it is, by its nature, not necessarily true that the impedance value is always calculated. More specifically, when the actual electric current value of the battery is zero, the impedance value cannot be obtained. Further, in an abnormal operating state of the battery or under other conditions, there may be cases where a possible impedance value to be determined by calculation does not represent any impedance value as a physical value. For example, when a varying amount per unit time of the actual electric current value of the battery is excessively large or in other situations, a value determined by calculation might not represent the impedance value obtained as a physical impedance value. As such, when the actual electric current value of the battery is zero, or when the varying amount per unit time of the actual electric current value exceeds a predetermined varying amount per unit time set in advance, it is not possible to obtain the impedance value which indicates physical meaning.

The learning process of the battery is performed with an established time interval. However, upon the occurrence of failure in acquisition of the impedance value, even though the actual I-V characteristic value is updated, it can not necessarily be said in some cases that the updated actual I-V characteristic curve is correctly learned because it is impossible to learn and update the theoretical I-V characteristic value that serves as a basis for the actual characteristic value. In such a case, a capability of acquiring the actual I-V characteristic curve as accurately as possible is needed.

The control unit 40 shown in FIG. 1 has a control function of causing the components that constitute the fuel battery system 10 to perform an unified operation, and also has, in this example, a function of learning the output characteristic curve of the fuel battery 30 and, when acquisition of the impedance value is determined to be inadequate, prohibiting the learning in order to acquire the actual I-V characteristic curve as accurately as possible. More specifically, the control unit 40 is configured to include a battery learning part 42 that learns the output characteristic curve of the fuel battery 30 based on an actual measurement value, and a power source drive controlling module 48 that controls power source drive of the fuel battery system 10 based on a learned result. In addition, the battery learning part 42 includes an I-V characteristic curve learning module 44 for learning the I-V characteristic curve and a learning prohibition judgment module 46 for judging whether or not the acquiring interval of the impedance value exceeds the predetermined threshold interval set in advance, and prohibiting the learning when the acquiring interval exceeds the predetermined threshold interval.

The above-described functions may be implemented by means of software, and more specifically may be implemented by executing a fuel battery learning program. The functions may be partially implemented by hardware.

Figure 4:
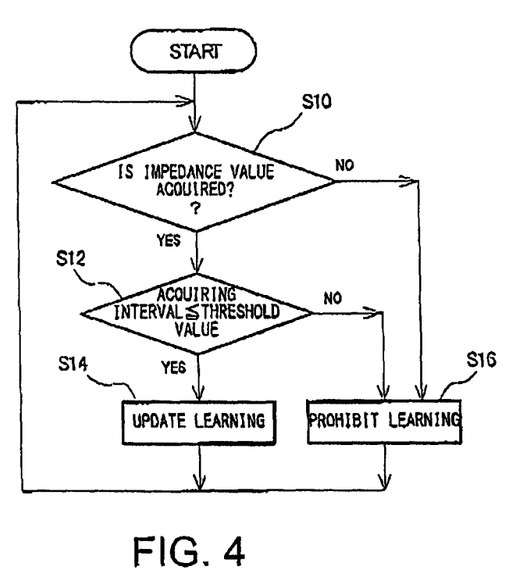
FIG. 4 is a flow chart showing a battery learning procedure relating to acquisition of an impedance value.
Figure 5:
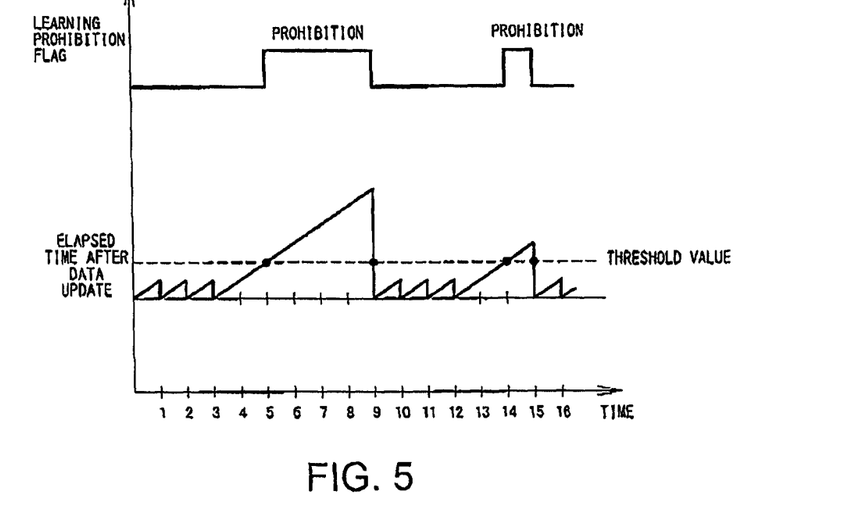
FIG. 5 is a time chart for acquisition of the impedance value and prohibition of learning in the battery learning system according to the embodiment of the present invention.

The operation of the above-described configuration, and in particular, each function of the battery learning part 42 of the control unit 40, will be described in detail with reference to FIGS. 4 and 5. FIG. 4 is a flow chart showing steps relating to acquisition of the impedance value in battery learning procedure, and FIG. 5 is a time chart for acquisition of the impedance value and prohibition of the learning. Reference numerals in FIG. 1 are used in the description below.

FIG. 4 is the flow chart showing the steps for judging whether or not the learning process is to be advanced or to be prohibited based on the acquiring interval of the impedance value. Each of the steps corresponds to an appropriate one of procedural steps in the battery learning program.

When the battery learning program for the fuel battery 30 is initiated, the actual electric current value and the actual voltage value are respectively detected by the electric current detection means 34 and the voltage detection means 36 at the predetermined time interval set in advance, and transmitted to the battery learning part 42 of the control unit 40. Then, the impedance value is calculated on the basis of the alternating current (AC) component in the detection value of the electric current detection means 34 and the alternating current (AC) component in the detection value of the voltage detection means 36. Based on the calculated impedance value, the I-V characteristic curve is learned. The details to be learned are as discussed previously. Process steps of the learning are implemented by the function of the I-V characteristic curve learning module 44 in the battery learning part 42 of the control unit 40.

During the learning, it is judged whether or not the impedance value is acquired (S10). The judgment is made every time the predetermined time interval elapses. Although the impedance value is calculated at the predetermined time interval in an automatic manner, the calculated value may not have physical meaning. In such a case, it is not desirable to use the calculated value that has no physical meaning as the impedance value in the battery learning. This procedural step is to judge whether or not the calculated value is acquired as the impedance value which can be used in the battery learning. Specifically, when the actual electric current value of the battery is zero, the impedance value is judged to be not acquired. In addition, when the varying amount per unit time of the actual electric current value exceeds the predetermined varying amount per unit time set in advance, the impedance value is also judged to be not acquired.

Every time the judgment as to whether or not the impedance value is acquired is made at the predetermined time interval (either the determination in step S10 is "Y" or "N"), based on the result, it is further judged whether or not the acquiring interval of the impedance value is smaller than or equal to the threshold interval (S12). This judgment is also performed at the predetermined time interval. Any interval may be defined as the threshold interval in advance.

Next, when positive judgment is made in S12 (the determination in step S12 is "Y"), i.e. when the impedance value is properly acquired within the threshold interval, learning and updating are performed based on the acquired impedance value (S14).

When negative judgment is made in S12 (the determination in step S12 is "N"), i.e. when the impedance value is not acquired for a long period of time exceeding the threshold interval, the learning based on the impedance value is prohibited (S16). More specifically, the theoretical I-V characteristic curve is prohibited from being updated, and the actual I-V characteristic curve to be learned on the basis of the theoretical I-V characteristic curve is prohibited from being updated. The steps in S10, S12, S14, and S16 are performed by the function of the learning prohibition judgment module 46 in the battery learning part 42.

FIG. 5 is the time chart for explaining a relationship among the acquiring interval of the impedance value, the threshold interval, and prohibition of the learning. The horizontal axis of FIG. 5 represents time, and numerals 1, 2, 3, . . . , 16 represent the predetermined time intervals at which a measurement for the impedance is performed, i.e. clock times at which sampling is performed. In a lower stage of FIG. 5, elapsed time to the present time since when the impedance value and others were updated based on the judgment that the impedance value is acquired is plotted along the vertical axis. In an upper stage of FIG. 5, on the other hand, values of a learning prohibition flag are plotted along the vertical axis.

As described above, in the lower stage of FIG. 5, the horizontal axis represents time points where measurement is performed, while the vertical axis represents the elapsed time from acquisition of the impedance value. At each time point where the measurement is performed, if and when the impedance value is acquired, the elapsed time from previous acquisition of the impedance value is reset to zero at that time point where the measurement is performed, and a new elapsed time is counted from that time point. An example of FIG. 5 shows that the impedance value is acquired at time points 1, 2, and 3 where the elapsed time is reset.

On the other hand, when the impedance value is not acquired at a certain time point of measurement, the above-described elapsed time is further accumulated without being reset to zero at the certain time point of measurement, and is increased until the next acquisition of the impedance value is achieved. The example of FIG. 5 shows that the impedance value is not acquired at time points 4, 5, 6, 7 and 8 where the elapsed time is consecutively accumulated, and the impedance value is acquired at the next time point 9 where the elapsed time is reset.

In addition, the example of FIG. 5 also shows that the impedance value is acquired at time points 10, 11, and 12, and that the impedance value is not acquired at time points 13 and 14 where the elapsed time is accumulated. Then, it is further shown that the impedance value is acquired at the next time point 15 where the elapsed time is reset.

In this example, the elapsed time from the acquisition of the impedance value is compared with a threshold value, and "1" is assigned to the learning prohibition flag, i.e. prohibition is specified when the elapsed time exceeds the threshold value, while "0" is assigned to the learning prohibition flag, i.e. the prohibition is canceled to thereby enable the learning, when the elapsed time is decreased to the threshold value or below. In the example of FIG. 5, the threshold value is set to an interval of time which is 1.5 times as long as that between time points of measurement. Therefore, when the impedance value is not acquired over two consecutive time points of measurement, the learning prohibition flag is assigned "1" for prohibition. Then, when next acquisition of the impedance value is achieved, the elapsed time is reset, and the learning prohibition flag is assigned "0" for cancelation of the prohibition, which causes the learning to be resumed based on the acquired impedance value.

As such, because the learning and updating of the output characteristic curve are prohibited when the impedance value is not acquired over a certain period of time, any incorrect update can be prevented, to thereby obtain the output characteristic curve with greater accuracy. It should be noted that in a time period during which the learning is prohibited, the power source drive of the fuel battery is controlled based on the previous impedance value learned before that time period. Even in this case, the control of the power source drive of the fuel battery is not greatly affected by continuous use of the theoretical I-V characteristic curve with the non-updated impedance value for some period of time because the theoretical I-V characteristic curve exhibits a relatively gentle change compared with the operation of the fuel battery. Thus, even when the learning is prohibited until the time the impedance value is updated again in a situation where the actual I-V characteristic curve is updated on the basis of the theoretical I-V characteristic, there is little likelihood of the control of the power source drive of the fuel battery being significantly affected by the prohibition of the learning.

INDUSTRIAL APPLICABILITY

The present invention may be applied to a system, such as a power source, using a battery that operates through electrochemical reaction. In addition to the fuel battery, a secondary battery, such as a lithium ion secondary battery, a nickel hydride secondary battery, a lead storage battery, an alkaline battery, or a manganese cell, may be used as the battery.

What is claimed is:

1. A battery learning system, wherein an output value at a predetermined characteristic step point set in advance is used as a characteristic value for an output characteristic of a battery that operates through an electrochemical reaction, the output characteristic is plotted as an output characteristic curve by connecting each discrete characteristic value, and the characteristic value acquired by actual measurement is learned to thereby update the output characteristic curve, the battery learning system comprising:
   an acquisition device that acquires an actual characteristic value of the battery;
   an impedance value acquisition device that acquires an impedance value of the battery;
   a storage device that stores the output characteristic curve of the battery; and
   an update device that updates, based on the acquired actual characteristic value, the stored output characteristic curve on a predetermined condition set in advance,
   the update device comprising,
   a judgment portion that judges whether or not an acquiring interval between acquisitions of the impedance value achieved by the impedance acquisition device exceeds a predetermined threshold interval set in advance, and
   a prohibition portion that prohibits updating of the output characteristic curve when the acquiring interval is judged to exceed the threshold interval by the judgment portion.

2. A battery learning system according to claim 1, wherein the battery is a fuel battery.

3. A battery learning system according to claim 1, wherein:
   the output characteristic of the battery is a current-voltage characteristic of the battery, while the output characteristic curve is an I-V characteristic curve;
   the battery learning system includes a calculation device that calculates an activation overvoltage which is a voltage value determined by eliminating a voltage drop due to an internal resistance of the battery from an actual voltage value that is determined based on the impedance value of the battery;
   the storage device stores an actual I-V characteristic curve relating, as actual output values of the battery, an actual electric current value to the actual voltage value, and a theoretical I-V characteristic curve relating the actual electric current value of the battery to the activation overvoltage, and
   the prohibition portion prohibits updating of the theoretical I-V characteristic curve and prohibits updating of the actual I-V characteristic curve to be learned on the basis of the theoretical I-V characteristic curve when the acquiring interval is judged by the judgment device to exceed the threshold interval.

4. A battery learning system according to claim 3, wherein:
the impedance value acquisition device does not acquire an impedance when the actual electric current value of the battery is zero, or when a varying amount per unit time of the actual electric current value exceeds a predetermined varying amount per unit time set in advance.

* * * * *

UNITED STATES PATENT AND TRADEMARK OFFICE
CERTIFICATE OF CORRECTION

PATENT NO. : 8,538,709 B2 Page 1 of 1
APPLICATION NO. : 12/747748
DATED : September 17, 2013
INVENTOR(S) : Ayako Kawase It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this
Fifteenth Day of September, 2015

Michelle K. Lee
*Director of the United States Patent and Trademark Office*